W. HUMPHREYS.
MEASURING GAUGE.
APPLICATION FILED DEC. 26, 1919.
1,422,576.  Patented July 11, 1922.
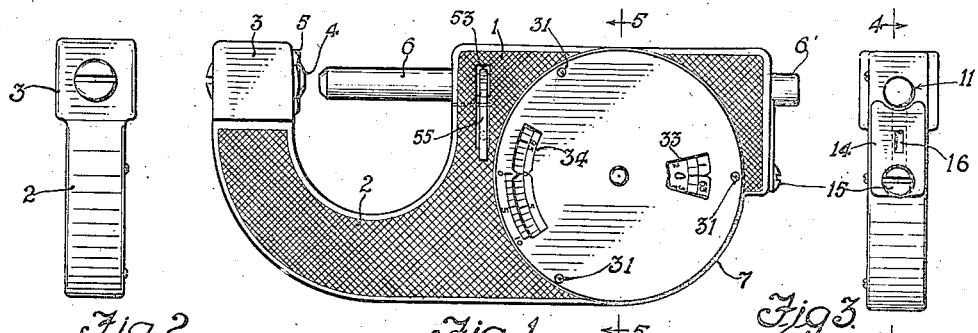
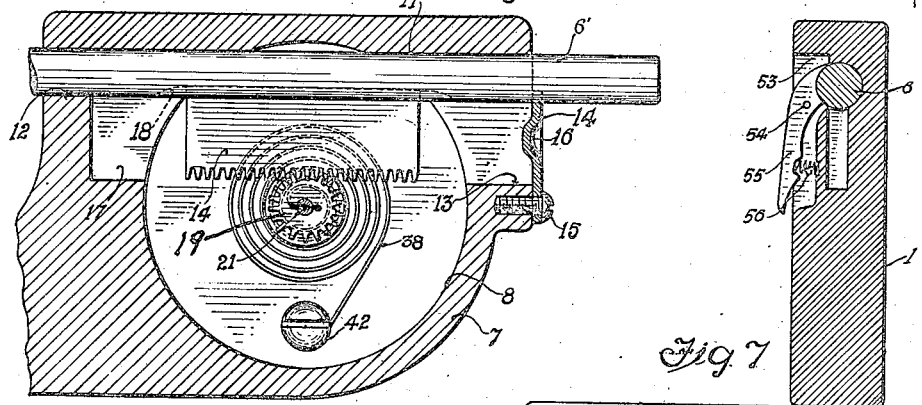
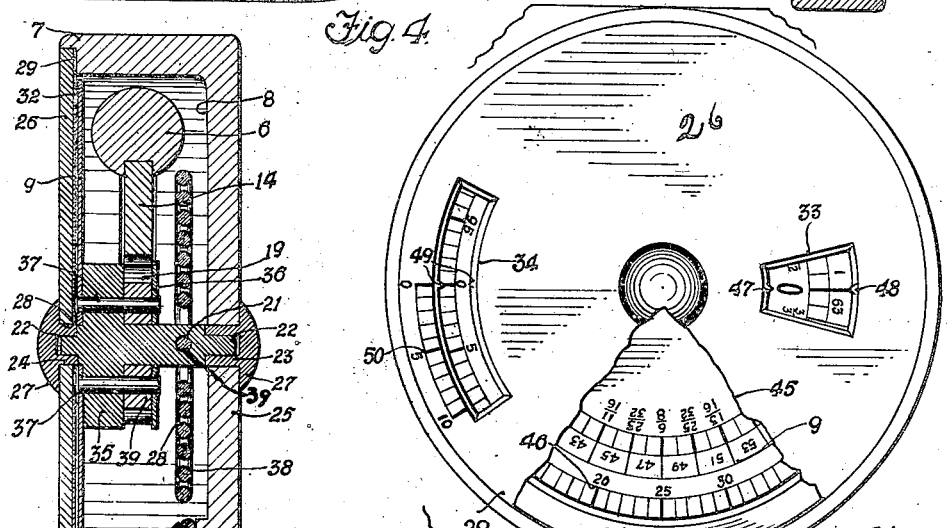
Inventor
William Humphreys
By Brown Bertsch Dunn
Attorneys.

UNITED STATES PATENT OFFICE.

WILLIAM HUMPHREYS, OF FULLERTON, PENNSYLVANIA, ASSIGNOR TO WILMORT MANUFACTURING COMPANY, OF CHICAGO, ILLINOIS, A CORPORATION OF ILLINOIS.

MEASURING GAUGE.

1,422,576.      Specification of Letters Patent.      Patented July 11, 1922.

Application filed December 26, 1919. Serial No. 347,554.

*To all whom it may concern:*

Be it known that I, WILLIAM HUMPHREYS, a citizen of the United States, residing at Fullerton, in the county of Lehigh and State of Pennsylvania, have invented a certain new and useful Improvement in Measuring Gauges, of which the following is a full, clear, concise, and exact description, reference being had to the accompanying drawings, forming a part of this specification.

My invention relates to an improved measuring gauge for measuring the thickness or diameter or other dimensions of various objects. More particularly, the present gauge is of the direct reading dial type adapted to indicate directly the thickness or other linear dimension of the object being measured.

The present invention is primarily concerned with an improved manner of constructing gauges of this general type, and has particular reference to numerous structural features, designed to provide an accurate, simple measuring gauge of compact, inexpensive construction.

A secondary object of the invention is to provide an improved arrangement of indicating dial and associated measuring scales for permitting micrometric readings of the gauge, whereby very small linear dimensions may be measured accurately and quickly.

In the accompanying drawings:

Figure 1 is a side elevational view of my improved gauge;

Figures 2 and 3 are different end views of the same;

Figure 4 is an enlarged fragmentary sectional view taken approximately on the line 4—4 of Figure 3;

Figure 5 is an enlarged sectional view taken on the line 5—5 of Figure 1;

Figure 6 is an enlarged isolated view of the cover plate showing the vernier scale thereon, and the several scales on the indicating dial, the cover plate being partially broken away and Figure 7 is a detail sectional view illustrating the detent lever for retaining the stem in its different measuring positions.

The gauge is embodied in a frame member 1 which is formed with a U shaped extension 2. At its end the extension 2 is formed with a squared head 3 in which is mounted an anvil screw 4, this anvil screw constituting the stationary contact member, between which and the movable contact member the object to be measured is placed. The screw 4 provides an adjustment for calibrating the gauge and is adapted to be locked in any position by the lock nut 5. The movable contact member for engaging the object to be measured consists of a cylindrical stem or plunger 6, which extends through guide openings in the main portion of the frame 1. The other end of the stem 6 projects out from the end of the frame 1 as indicated at 6', and it will be apparent that the two contact members can be made to approach each other for engaging the object to be measured by simply depressing the end of the stem 6'. Where it is desirable to have the device mounted stationary for facility of operation, I contemplate mounting the gauge as an entirety, either permanently or removably, on a stationary bracket, or mounting only the large portion of the frame 1, together with the stem 6, on the bracket, with the stem 6 cooperating with a stationary gauging contact on the bracket.

The frame member 1, which preferably consists of a die casting, is formed with a cylindrical housing portion 7, which defines a circular recess or cavity 8 for receiving the indicating dial 9 and the operating mechanism therefor. The stem 6 enters this recess 8 through holes 11 and 12 in the end walls of the housing 7. It will be noted that the hole 11 in the end of the housing is formed with a depending slot 13 for permitting the insertion of the toothed rack 14, which is carried by the stem 6. The outer end of the slot 13 is closed off by a small stop plate 14, which, as clearly shown in Figure 4 is fastened to the end of the housing 7 by a single screw 15, being securely held in place by an indentation or punching 16 which sets into the slot 13. The housing 7 adjacent the other hole 12 is similarly slotted or recessed as indicated at 17 to permit full longitudinal movement of the toothed rack 14.

This rack 14 consists of a toothed bar which is set into a slot 18 milled in the cylindrical body of the stem 6, the rack being rigidly held in place by punching or crimping the sides of the slot into rigid engagement with the rack. The teeth of the rack 14 mesh with a spur pinion 19, which is mounted on a shaft 21 journaled centrally in the circular recess 8. As clearly shown in Figure 5, the ends of the shaft 21 are reduced as indicated at 22 to bear in small jewel bearings 23 and 24. The steel jewel 23 is mounted in the rear wall 25 of the housing portion 7, and the other slightly shorter jewel 24 is mounted in a cover plate 26, which closes off the open front of the housing portion 7. The shaft ends 22 are supported in closed end bearing pockets in the steel jewel, which are immune to the entrance of dust and dirt. Both steel jewels are provided with exterior rounded heads 27, which retain the jewels against inward displacement and also nicely finish off the outer appearance of the gauge. These steel jewels are preferably held in place by a force fit, i. e., for example by crowding the metal around the jewel shank. It will be seen that by employing the present form of jewel bearings, these bearings can be constructed of a good quality of suitable steel and thereby insure efficient long-wearing bearings, which could not be obtained by forming the bearings directly in the body of the device. This construction of jewel bearings effectually excludes the dust from the interior of the housing, and furthermore renders easy the renewal of the bearings, if the same should be desired.

The circular cover plate 26 is set into a groove 29, formed in the wall of the circular recess 8, in which the cover plate is held by screws 31—31. A thin celluloid washer 32 is seated in the groove 29 directly under the cover plate 26, or is cemented to the circular cover plate, and serves to close the two sight openings or windows 33 and 34,—through which the scales and the dial 9 are read, against the entrance of dirt and the like. The dial 9 preferably consists of a metal disc which is rigidly mounted on an enlarged collar 35 formed integrally with the shaft 21. The spur pinion 19, which meshes with the toothed rack 14, is mounted on the other side of the collar 35, and a guiding washer 36 is supported outside of the pinion 19. The dial 9 and pinion 19, together with the guide washer 36 are all rigidly pinned to the collar 35 by small pins 37, the ends of which are headed to prevent displacement. It will be noted that the collar 35 and guide washer 36 embrace the sides of the teeth on the pinion 19 so as to prevent the accidental unmeshing of the teeth on the rack 14, which might otherwise result from rotation of the stem 6. The stem 6 is impelled outwardly so as to normally maintain the gauging contacts separated by means of a spiral spring 38 which is disposed adjacent the rear housing wall 25. The inner end of the spring is secured in a hole in the shaft 21, as indicated at 39, and the outer end encircles the reduced end of a stud 41 formed integrally with the wall 25 from which the spring is prevented from accidentally disengaging by a screw 42. The spring 38 is preferably arranged so that the depression of the stem 6 coils the spring. In assembling the gauge this spring is placed under an initial expansion tension so that the teeth of the pinion 19 will always have the same corresponding tooth faces in engagement with the tooth faces of the rack teeth. This relation eliminates all back lash and play between the toothed members, which might otherwise result in inaccurate readings.

The pinion 19 is preferably designed with a pitch circle of exactly one inch in circumference, so that a linear gauging motion of the stem equal to one inch will result in one entire revolution of the dial 9, whereby the dial can be divided up directly into the fractional parts of the inch. The dial 9 is marked off with two independent scales 45 and 46, the scale 46 being readable in the dial window 34. The scale 45 is subdivided into a plurality of minor scales beginning from the innermost scale, which is scaled into 8th's and, being graduated outwardly therefrom to the outermost scale which is scaled into 64th's. Small index pointers 47 and 48, formed in the beveled margins of the dial window 33, cooperate with these several scales for reading the same. The outer scale 46 is graduated into hundredths of an inch and is adapted to cooperate with index pointers 49 formed in the dial window 34. To permit of micrometric measurements accurate to 1/1000 of an inch, there is provided a vernier scale 50 preferably marked on the cover plate 29 along the lower half of the dial window 34. This vernier cooperates with the hundredths scale 46, and to this end the tens scale divisions on the vernier are marked off to correspond to nine of the scale divisions of the hundredths scale 46. This particular numerical relation may of course be modified if desired. The manner of using the vernier will be apparent to those skilled in the art.

It frequently arises that the object to be measured is located inaccessibly or in the dark, so that the reading of the dial with the gauging contacts in engagement with the object is inconvenient. To obviate this objection I have provided an improved detent or clamping lever 52 on the frame 1, which is adapted to automatically clamp and retain the stem 6 in any measuring position to which it has been moved, so as to permit removal of the measuring gauge from the object for reading in a more convenient position or in a better light. This detent lever is mounted in a slot 53 in the frame 1, being pivoted on a short pivot pin 54, which is set into a drill hole intersecting the slot 53 (Figure 7). The detent lever comprises a clamping portion 55 which is adapted to bear against the side of the stem 6. This clamping portion may be provided with any preferred construction of frictional face for more efficiently clamping the stem 6, if desired. The lever is held in firm frictional engagement with the stem by a compression spring 56 which is set into a cup-shaped depression in the bottom of the slot 53. The compression strength of this spring does not appreciably hinder the depressing of the stem in performing a measurement, but it is ample to rigidly hold the stem in its measuring position after removal of the gauge from the object. The detent lever is released to permit return of the stem to normal position by simply depressing the projecting tail end of the detent lever.

Where several scales are desirable, such as separate scales for different systems of measurement or the like, I contemplate using two dials, the other dial being disposed adjacent the rear wall 25 of the housing and being readable through dial openings in this wall. The instrument may also be employed with similar scales on both sides for the sake of greater convenience.

I claim:

1. In a measuring gauge the combination of a frame member having an extension supporting an adjustable contact screw, said frame member comprising an open housing for enclosing an indicating dial, a gauging stem slidable in said housing and adapted to cooperate with said contact screw, a cover plate for closing said housing, a shaft in said housing for supporting said dial, and jewel bearings mounted in said housing and in said cover plate for pivotally supporting said shaft, said jewel bearings comprising shank portions pressed into rigid setting in openings in said housing and said cover plate and having heads bearing against said housing and said cover plate.

2. In a measuring gauge, the combination of a frame member having a U shaped extension supporting an adjustable stationary gauging contact, said frame member comprising an open housing, a stem longitudinally slidable in said housing and adapted to cooperate with said gauging contact, an indicating dial in said housing, a cover plate for closing said housing, a shaft for supporting said indicating dial, a pinion on said shaft meshing with a rack on said stem, and metallic jewel bearings mounted in said housing and in said cover plate for pivotally supporting said shaft, said jewel bearings being composed of harder bearing metal than said frame member and comprising shank portions pressed into rigid setting in openings in said housing and said cover plate, said shank portions having heads engaging on the outer walls of said housing and said cover plate and having bearing recesses for receiving the ends of said shaft.

3. In a linear measuring gauge, a frame member formed with a circular recess therein, a stem slidable through said frame member and having a rack mounted thereon, a shaft journaled in said recess, a rotatable indicating dial mounted on said shaft, a pinion on said shaft meshing with said rack supported by said stem, said frame member having a slot for permitting the insertion of said stem and rack into said circular recess, and a stop plate for closing said slot.

4. In a linear measuring gauge, a frame member comprising a housing enclosing a rotatable indicating dial, a gauging stem slidable through said housing, said gauging stem comprising a rack adapted to rotate said dial, said housing having an opening therein for permitting the projection of said stem, said housing having a slot extending from said opening for permitting the entrance of said rack into said housing and a stop plate mounted on said housing for closing said slot.

5. In a linear measuring gauge, a frame member comprising a housing adapted to enclose a rotatable indicating dial, a cylindrical stem slidably mounted in said housing, said stem having a slot formed therein, a rack bar set into said slot and rigidly fastened therein, said housing provided with circular openings to permit sliding motion of said stem, said housing having a slot formed co-extensive with one of said openings for permitting the insertion of said rack bar along with the stem into said housing, a stop plate closing the outer end of said slot, a screw for mounting said stop plate on said housing and a projection on said stop plate lying in said slot for holding said plate in proper position against said housing.

6. In a linear measuring gauge, a frame member comprising a housing adapted to enclose a rotatable indicating dial, a stem slidable in said housing and having a rack mounted thereon, a shaft journaled in said housing, said shaft comprising an enlarged collar portion, said indicating dial being rigidly secured to one side of said collar portion and a pinion rigidly secured to the other side of said collar portion and meshing with a rack carried by said stem.

7. In a linear measuring gauge, the combination of a frame member having an extension supporting a stationary gauging contact, said frame member comprising an open housing adapted to enclose a rotatable indicating dial, said dial having a plurality of measuring scales, a gauging stem reciprocably mounted in said housing and adapted to cooperate with said stationary gauging contact, a cover plate for closing said housing, said cover plate having a plurality of dial windows, a shaft for supporting said indicating dial, metallic jewel bearings mounted in said cover plate and in the rear wall of said housing for pivotally supporting said shaft, said shaft comprising reduced bearing ends engaging in said jewel bearings, said shaft also comprising an enlarged collar portion, said indicating dial being mounted on one side of said collar portion and a spur pinion mounted on the other side thereof, pins extending to said collar portion for securing said dial and said pinion thereto, a spiral spring having its ends secured to said shaft and to said housing, and a rack depending from said stem and meshing with said pinion.

8. In a linear measuring gauge, a frame member having an extension supporting a stationary gauging contact, said frame member comprising a housing adapted to enclose a rotatable indicating dial, a stem slidably mounted in said housing and adapted to cooperate with said stationary gauging contact, a cover plate closing said housing, a shaft journaled between said cover plate and said housing, said shaft supporting said indicating dial, a pinion on said shaft meshing with a rack carried by said stem, a plurality of concentric scales on said dial of various degrees of gradation, dial window means for exposing the several scales on said dial, and a stationary vernier scale of short angular dimension formed along one margin of said window means and adapted to cooperate with one of said scales.

In witness whereof, I hereunto subscribe my name this 29 day of November, 1919.

WILLIAM HUMPHREYS.